US012558880B2

(12) United States Patent
Limatibul

(10) Patent No.: US 12,558,880 B2
(45) Date of Patent: Feb. 24, 2026

(54) RECYCLED AND RECYCLABLE BARRIER LAMINATE TUBE

(71) Applicant: KIM PACK CO., LTD., Bangkok (TH)

(72) Inventor: Sumet Limatibul, Bangkok (TH)

(73) Assignee: KIM PACK CO., LTD., Bangkok (TH)

( * ) Notice: Subject to any disclaimer, the term of this patent is extended or adjusted under 35 U.S.C. 154(b) by 326 days.

(21) Appl. No.: 18/037,010

(22) PCT Filed: Mar. 31, 2022

(86) PCT No.: PCT/TH2022/000013
§ 371 (c)(1),
(2) Date: May 15, 2023

(87) PCT Pub. No.: WO2022/216239
PCT Pub. Date: Oct. 13, 2022

(65) Prior Publication Data
US 2023/0405982 A1     Dec. 21, 2023

(30) Foreign Application Priority Data

Apr. 5, 2021     (TH) ................................. 2101002007

(51) Int. Cl.
B32B 27/08     (2006.01)
B32B 1/08     (2006.01)
(Continued)

(52) U.S. Cl.
CPC ................ B32B 27/08 (2013.01); B32B 1/08 (2013.01); B32B 7/12 (2013.01); B32B 27/306 (2013.01);
(Continued)

(58) Field of Classification Search
CPC ......... B32B 1/08; B32B 27/08; B32B 27/306; B32B 27/32; B32B 2250/246;
(Continued)

(56) References Cited

U.S. PATENT DOCUMENTS 5,712,009 A * 1/1998 Moore .................... B29C 49/04
206/524.1
6,960,375 B2 * 11/2005 Giblin .................. B65D 1/0215
428/903.3
(Continued)

FOREIGN PATENT DOCUMENTS

CN     103608402 A * 2/2014 ............. C08L 23/06
CN     109070562 A     12/2018
(Continued)

OTHER PUBLICATIONS

ISR for International Application PCT/TH2022/000013 mailed Jul. 20, 2022.
(Continued)

*Primary Examiner* — Aaron Austin
(74) *Attorney, Agent, or Firm* — LADAS & PARRY LLP

(57)     ABSTRACT

A laminated tube comprising of post-industrial and/or post-consumer recycled resin and the amount of the blends to provide acceptable tube performances and recyclability. The use of recycled resin is to reduce the carbon footprint of packaging tube and closed-loop recycling. The present invention utilizes a layer of multilayer flexible sheet to produce recyclable packaging by the selection of virgin plastics.

6 Claims, 2 Drawing Sheets

100

(51) Int. Cl.

| | | |
|---|---|---|
| *B32B 7/12* | (2006.01) |
| *B32B 27/30* | (2006.01) |
| *B32B 27/32* | (2006.01) |
| *B65D 65/40* | (2006.01) |

(52) U.S. Cl.
CPC .............. *B32B 27/32* (2013.01); *B65D 65/40* (2013.01); *B32B 2250/05* (2013.01); *B32B 2250/246* (2013.01); *B32B 2255/10* (2013.01); *B32B 2255/205* (2013.01); *B32B 2270/00* (2013.01); *B32B 2272/00* (2013.01); *B32B 2307/7244* (2013.01); *B32B 2307/7246* (2013.01); *B32B 2307/75* (2013.01); *B32B 2439/40* (2013.01); *B32B 2597/00* (2013.01)

(58) Field of Classification Search
CPC ........... B32B 2250/24; B32B 2270/00; B32B 2272/00; B32B 2597/00; Y02W 30/62
See application file for complete search history.

(56) References Cited

U.S. PATENT DOCUMENTS

| | | | | | |
|---|---|---|---|---|---|
| 8,083,064 | B2 * | 12/2011 | Boswell | .................. | B29B 7/007 206/524.1 |
| 8,475,900 | B2 * | 7/2013 | Miskevich | .......... | B29C 49/0411 525/240 |

| | | | | | |
|---|---|---|---|---|---|
| 10,214,639 | B2 * | 2/2019 | Abhyankar | ............. | C08L 23/06 |
| 2008/0178768 | A1 * | 7/2008 | Breese | ................... | B32B 27/32 106/285 |
| 2014/0106152 | A1 | 4/2014 | Ramchandra et al. | | |
| 2014/0295118 | A1 * | 10/2014 | Banerjee | ................. | B32B 27/08 428/339 |
| 2018/0345628 | A1 | 12/2018 | Kimpai | | |
| 2019/0077128 | A1 * | 3/2019 | Limatibul | ................. | B32B 7/12 |
| 2022/0355587 | A1 * | 11/2022 | Limatibul | ............... | B32B 27/36 |
| 2023/0264449 | A1 * | 8/2023 | Marcher | ................. | B65B 11/02 53/441 |

FOREIGN PATENT DOCUMENTS

| | | | | | |
|---|---|---|---|---|---|
| CN | 109648975 | A | 4/2019 | | |
| CN | 111849011 | A | 10/2020 | | |
| CN | 112477341 | A | 3/2021 | | |
| DE | 202020005571 | U1 * | 9/2021 | ............. | B32B 27/16 |
| EP | 0847842 | A1 * | 6/1998 | | |
| JP | 2016104564 | A | 6/2016 | | |
| WO | 2021154162 | | 8/2021 | | |
| WO | WO-2025017117 | A1 * | 1/2025 | ............. | B29C 48/92 |

OTHER PUBLICATIONS

Written Opinion for International Application PCT/TH2022/000013 mailed Jul. 20, 2022.

\* cited by examiner

100

104 —
107 —
109 —

102
106
108
110

200

204 —
201 —

202
206
207

RECYCLED AND RECYCLABLE BARRIER LAMINATE TUBE

CROSS REFERENCE TO RELATED APPLICATIONS

This application is a U.S. National Stage Application under 35 U.S.C. § 371 of International Application No. PCT/TH2022/000013 which was filed on 31 Mar. 2022, which claims priority from Thailand application Ser. No. 2101002007 filed 5 Apr. 2021 the disclosures of which are incorporated in their entirety by reference herein.

FIELD OF THE INVENTION

This present invention is in the field of materials science and relates to Recycled and Recyclable Barrier laminate tube.

BACKGROUND ART

Million of tons of plastic packaging are in circulation every year around the world. Plastics are a rapidly growing segment of municipal solid waste (MSW) and take centuries to break down in landfill or the ocean. Alternative recyclable plastics are becoming attractive for closing the loop of plastics. Many studies suggest recycled plastics contain over 25% w/w less green-house/carbon gas emissions than virgin resins. The more post-consumer recycled resins (PCR resins) you include in your products, the higher impact you can make on saving the environment. Recyclable plastics should be collected, sorted, and recycled to reduce landfill, conserve energy and environment. Nowadays, there are available technologies including mechanical recycling machines that can improve recycling and benefit the economy.

Post-consumer resin containers contain contaminants of paper and other plastic resins, for example, and it has been generally thought that they cannot make satisfactory plastic containers. Washing processes for plastic recycling are mainly used for eliminating all contaminants from materials. For highly contaminated material, e. g. to remove adhesives from labels, and to meet food grade standards, hot washing may be required. In a continuous hot washer, the flakes are soaked in a mixture of hot water washing solution, followed by a friction washer where the material is rinsed. Caustic solution and detergent are options for enhancing the decontamination of inks or glues. Recycling technologies proven for FDA compliant recycled plastic for food-grade packaging are highly recommended for food and cosmetic industries.

Post-industrial recycled materials (PIR) are products that contain some percentage of manufacturing waste material that has been reclaimed from a process generating the same or a similar product. Those materials have a high level of quality and consistency.

Post-consumer recycled materials are generated by the final consumer (residential or non-residential) after they have served their intended use and have been collected for reuse or recycling, and do not include materials and by-products generated from and commonly used within an original manufacturing process (PIR). In the use of plastic materials for containers such as bottles, it has been found desirable to attempt to recycle and reuse the plastic which is commonly known as post-consumer plastic (PCP) or post-consumer resin (PCR). It has been suggested that such post-consumer resin be utilized because large quantities of high-density polyethylene post-consumer resin are available due to the extensive use of high-density polyethylene in large containers for milk and household products.

The use of post-consumer recycled plastics such as polyethylene and polypropylene depend on the pellet properties of reprocessing plastics. Processing stability, density, melt index, tensile yield, flexural modulus, and impact resistance are critical to determine the quality of the recycled resins and should fulfill requirements of converters.

Specifically, when containers are made from post-consumer high-density polyethylene homopolymer or copolymer (HDPE) container scraps, it has been found that the containers have diminished physical properties and particularly diminished resistance to stress cracking. Such containers made of high-density polyethylene have been used for packaging of certain types of liquid detergent products. The use of such containers to package liquid detergent products has been somewhat restricted, however, by reason of the fact that many types of liquid detergent products accelerate the tendency of the container to exhibit stress cracking.

Stress cracking is evidenced by the appearance of hazy cracks in the container which are aesthetically unpleasing to the ultimate consumer. In extreme cases, stress cracking can lead to leakage of the contents from the container. Stress cracking can occur when the containers are for liquid products including liquid detergents and liquid hypochlorite bleaches.

PCR resins can be alternatively made from the mixed wastes with the rejects and residues from other mechanical or material recycling operations. Mixed waste, including multilayer LDPE, LLDPE, HDPE, polypropylene and a smaller amount of polystyrene can be used as raw materials for chemically recycled pyrolysis oil and purified hydrocarbons. The latest technology uses an integrated process of pyrolysis and purification to obtain pyrolysis oil feedstock. Further fractionation and distillation are used to separate into three different fractions: heavy vacuum gas oil (HVGO), diesel, and light vacuum gas oil (LVGO). The LVGO is then used to produce plastic monomers and chemicals such as benzene, toluene, xylene, etc. The recycled raw materials as monomers will be fed into the plastic production cycle, thereby partially replacing fossil resources. The share of recycled raw material is allocated to the final product by using a certified mass balance approach. The final properties of PCR resin made from pyrolysis are expected for a food grade resin used in food packaging.

Available filtration in mechanical recycling process is an option for producing food grade resins used in food packaging. As a result, recycled material can be converted into plastic products replacing virgin raw materials.

Moreover, the parameters of HDPE use are critical for recyclable tubes. Up to now, the ratio of low-density polyethylene has been higher than high-density polyethylene in laminate tubes, which does not fall within critical values of HDPE required for optimal recyclable tube design. A recyclable tube should consist of at least 50% w/w of high density polyethylene for better compatibility with HDPE recycling streams.

In case of functional barriers in polyolefin containers, there should be <5-6% w/w of ethylene vinyl alcohol and 3% w/w of PE-g-MAH tie layers for full compatibility. Other barrier combinations should be evaluated and tested for determining the plastic packaging recyclability.

Accordingly, among objectives of the present invention are to provide a blend of post-consumer resin from high density polyethylene containers and the like which will have substantial resistance to stress cracking and which will have minimal reduction in other physical properties permitting its use for various kinds of containers, which can be used for containing various products.

U.S. Pat. No. 5,712,009 describes a coextruded multilayer and blow molded plastic container. The side wall consists of a thin outer layer, a thin intermediate opaque layer comprising a blend of post-consumer resin, and a relatively thick inner plastic layer. In a modified and preferred form, a fourth inner layer of virgin polyethylene polymer is provided.

U.S. Pat. No. 6,960,375 describes a bottle having at least three layers in which the outer and inner layers contain a metallocene polyethylene polymer and the middle layer comprises virgin high-density polyethylene, reground and post-consumer recycled resin, with the bottle having at least 10% light transmittance in the visible spectrum.

U.S. Pat. No. 8,083,064 describes a container with a sustainable, recyclable, two-year shelf life substantially free of virgin petroleum-based compounds, the invention comprising: (a) a container; (b) a cap; (c) a label. The composition of the container consists of a blend of virgin resin, reground resin, post-consumer recycle resin, post-industrial plastic resin and renewable plastic resin.

U.S. Pat. No. 8,475,900 describes a high-content PCR HDPE container comprising: a blend of PCR HDPE, impact modifier, and elastomer.

U.S. Pat. No. 10,214,639 describes a laminate comprising an outer layer of a post-consumer recycled polymer composition consisting of a post-consumer recycled resin, and ethylene alpha olefin copolymer. The post-consumer recycled resin is a High-Density Polyethylene (HDPE) resin.

SUMMARY OF THE INVENTION

The present invention relates to recyclable laminate tubes and the use of recycled resin in packaging tubes that can be used in personal, home, or skin care products and a method of making the recyclable and recycled plastic packaging tubes to satisfy the need for environmental friendly tube packaging.

In accordance with the invention, there is provided a laminated tube comprising a resin blend including post-industrial and/or post-consumer recycled resin wherein the respective amounts of resins in the blends provide acceptable tube performances and recyclability. The use of recycled resin reduces the carbon footprint of the laminated tube and enables closed-loop recycling. The present invention utilizes a layer of multilayer flexible sheet to produce recyclable packaging by incorporation of virgin plastics.

DETAILED DESCRIPTION

Figure 1:
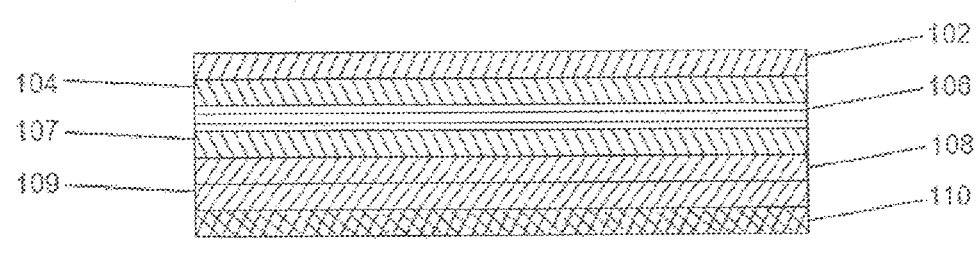
FIG. 1 is a seven-layer film for forming into the multi-layer packaging tube of the invention.

The present invention discloses a recyclable tube with a post-consumer recycled (PCR) resin addition of 15% to 70% (w/w) of PCR resin and 30% w/w to 85% w/w of virgin polyolefin resin.

The first embodiment of the present invention provides a recycled and recyclable multi-layer packaging tube comprising the following composition:

a) an outer layer film consisting essentially of a virgin polyolefin resin and recycled resin, wherein said recycled resin is high-density polyethylene, wherein said outer layer film further comprises a printed image;

b) a polyolefin-based extrusion layer abutting said outer layer;

c) an extrusion tie layer;

d) a barrier layer comprising EVOH in an amount of less than 5% w/w;

e) an extrusion tie layer;

f) a polyolefin-based extrusion layer abutting said inner layer;

g) an inner layer film consisting essentially of a virgin polyolefin resin and recycled resin, wherein said recycled resin is high-density polyethylene;

h) a body of the tube has the recycled HDPE in an amount that is higher than 50% w/w;

i) a shoulder of the tube has the recycled HDPE in an amount of 75-85% w/w;

wherein said recycled resin comprises high-density polyethylene, wherein said recycled resin is made from post-industrial or post-consumer recycled resin.

The second embodiment of the present invention provides a recycled and recyclable metalized multi-layer packaging tube comprising the following composition:

a) an outer layer film consisting essentially of a virgin polyolefin resin and recycled resin, wherein said recycled resin is high-density polyethylene, wherein said outer layer film further comprises a printed image;

b) an adhesive layer abutting said outer layer; and c) a metalized polyolefin layer film having aluminium vapor on the top side, d) a polyolefin-based extrusion layer abutting said metalized polyolefin layer;

e) an extrusion tie layer;

f) a barrier layer comprising EVOH in an amount of less than 5% w/w;

g) an extrusion tie layer;

h) a polyolefin-based extrusion layer abutting said inner layer;

i) an inner layer film consisting essentially of a virgin polyolefin resin and recycled resin, wherein said recycled resin is high-density polyethylene;

j) a body of the tube has recycled HDPE in an amount that is higher than 50% w/w;

k) a shoulder of the tube has recycled HDPE in an amount of 75-85% w/w;

wherein said recycled resin film is high-density polyethylene, wherein said recycled resin is made from post-industrial and/or post-consumer recycled resin.

The second embodiment of the present invention provides a plastic container wherein said recycled resin comprises at least 15% w/w of a fusion blend of resins.

The present invention relates to a process of manufacturing tubes comprising blown film extrusion of PCR resin comprising 15% w/w to 70% w/w of PCR resin and 30% w/w to 85% w/w of virgin polyolefin resin. Extrusion lamination of film with molten barrier resin is used for increasing barrier properties of the tube package.

A tube package containing a layer of up to a 5% weight by weight of EVOH with a minimum of 32 mol % ethylene can be compatible with a post-consumer HDPE recycling stream.

A multilayer recyclable tube should have a high-density polyethylene content in the total structure that is higher than 50% w/w in the tube for achieving a desired overall density and melt index of HDPE stream.

DETAILED DESCRIPTION OF THE PREFERRED EMBODIMENTS

In accordance with the invention, there is provided a plastic container made from a fusion blend of recycled resin and a high-density polyethylene copolymer resin. The recycled resin can be primarily a post-consumer high-density polyethylene and may contain small amounts of colored plastic containers. The physical properties of the container including stress crack resistance are preserved as contrasted to the loss of such physical properties that have heretofore resulted from the use of post-consumer resins. Preferably, PCR-HDPE is used in the blend without direct contact to the food products. In the case of chemical recycling PCR resin, the resin quality is high due to relatively low contaminants and safe for direct food contact.

In accordance with the invention, pellets of a PCR high density polyethylene resin and pellets of a virgin high-density polyethylene copolymer were mixed and fusion blended. Containers were blow molded and subjected to testing for stress cracking, top load and drop impact.

SABIC is also offering a new SABIC HDPE booster grade to help incorporate PCR or increase the existing PCR content in containers from 30% w/w to 60% w/w. This is without facing degradation and processing issues, while minimizing quality variations on machine efficiency. The resulting packaging aims to meet processing and quality standards of the industry, contributing further to efficiency by saving on virgin materials.

The blends of the present invention contain about 15-70% weight by weight of post-consumer resin and about 30-85% weight by weight of virgin high-density polyethylene copolymer resin.

Post-consumer resin contains primarily the plastic from high density polyethylene homopolymer containers used for packaging milk and small amounts of colored plastic containers and possible polypropylene resin from syrup bottles, multi-layer ketchup bottles and caps. Such post-consumer resin has the properties set forth in the following Table 1. In contrast, the PIR-HDPE resin properties are easier to select due to the known resin properties, except for the cleanliness of the PIR-HDPE itself.

TABLE 1

PCR-HDPE resin properties

| Property | Method | Specifications |
|---|---|---|
| Melt index | ASTM D1238 | $0.27 \pm 0.05$ g/10 min, 2.16 kg 190 Celsius |
| Density | ASTM D792 | $0.947 \pm 0.005$ g/cm$^3$ |
| Tensile strength | ASTM D638 | $3,700 \pm 500$ psi |
| Max elongation | ASTM D638 | >110% |
| Flexural strength | ASTM D790 | $3,850 \pm 1,000$ psi |
| Flexural modulus | ASTM D790 | $108,000 \pm 25,000$ psi |
| Izod impact | ASTM D256 | >600 J/m Non-break |
| % w/w of PP | ASTM D5576 | Max3% |
| Moisture | 105 Celsius, 30 min. | ≤0.14% |
| L*, a*, b*, and Delta E | X-rite ci4200 with iQC compared with virgin HDPE | L* = $71.8 \pm 3.5$ a* = $-2.3 \pm 1.0$ b* = $6.3 \pm 1.2$ Delta E = $7.8 \pm 1.6$ |

TABLE 2

Example of HDPE selection for recyclable laminate tube

| No. | Property | Unit | HDPE specification | | | |
|---|---|---|---|---|---|---|
| 1 | Density (g/cm$^3$) | ASTM D1505 (USA), ASTM D792, ASTM D4883 | 0.96 | 0.951 | 0.961 | 0.953 |
| 2 | MFR (190° C., 2.16 kg) (g/10 min) | ASTM D1238 | 0.7 | 1.1 | 3.7 | 1.8 |
| 3 | Tensile strength at yield (MPa) | ASTM D638 (MD/TD) | 32/33 | 24 | 31 | 26 |
| 4 | Elongation at break (%) | ASTM D638 (MD/TD) | 500/5 | 1000 | 1000 | 1200 |

6

TABLE 2-continued

Example of HDPE selection for recyclable laminate tube

| No. | Property | Unit | HDPE specification | | | |
|---|---|---|---|---|---|---|
| 5 | ESCR (condition B, F$_{50}$) (h) | ASTM D1693 | 72 | — | 6 | 20 |

Generally, the overall HDPE content in the laminate tube (body and shoulder) is approximately less than 50% w/w. The recyclability of the laminate tube with HDPE content less than 50% w/w is not good enough to include the tube into HDPE recycling stream. The recycled pellet properties do not meet the requirements in the recycling industry. The requirement includes extrusion evaluation, pellet testing, physical and mechanical properties, bottle production and testing.

The recyclability of a tube can be achieved by adding more than 50% w/w HDPE in the laminate tube. The HDPE resin selection has been shown in Table 2. Each HDPE resin has unique properties; however, the HDPE selection should include a melt index lower than 4 g/10 min at 190 degree Celsius, 2.16 kg. Preferably, HDPE resin should have a melt index between 0.3-2.5 g/10 min at 190 degree Celsius, 2.16 kg.

A difference in tube stiffness between conventional plastic tube and recyclable tube is shown in Table 3. By using a universal tensile testing machine, a push-pull gauge with speed 100 mm/min at a distance of half the diameter of the tube can be used to measure the tube stiffness in units of gram force. It is found that a recyclable laminate tube is slightly stiffer than the conventional plastic barrier laminate tube. This is caused by an increase of HDPE content in the laminate tube.

TABLE 3

Laminate tube stiffness of conventional and recyclable plastic barrier laminate tube

| | Tube stiffness (gf) | |
|---|---|---|
| Sample no. | Conventional plastic barrier laminate tube, 380 mc., tube dia. 60 mm | Recyclable plastic barrier laminate tube, 380 mc., tube dia. 60 mm |
| 1 | 536 | 513 |
| 2 | 478 | 556 |
| 3 | 509 | 511 |
| 4 | 521 | 534 |
| 5 | 488 | 518 |
| 6 | 513 | 540 |
| 7 | 508 | 524 |
| 8 | 504 | 507 |
| 9 | 511 | 513 |
| 10 | 510 | 519 |
| Avg | 507.8 | 523.5 |
| Std | 16 | 15.4 |

To achieve tube recyclability in a HDPE or PE recycling stream, overall density and melt index of tube flake/pellet should include a density>0.941 g/cm3 and melt index<0.75 g/10 min.

A virgin high density copolymer resin contains linear high-density ethylene polymer. The linear high-density ethylene copolymer included in the blends will have a density of at least about 0.94 g/ml, a melt index of less than about 0.5 g/10 min. and will have polymerized therein at least about 98 mol % ethylene with any comonomer polymerized therein being an alpha-mono olefin containing about 3 to 12 carbon atoms. Such linear high-density ethylene polymers are known and reported in the art and are commercially available from numerous commercial producers. Such linear high-density ethylene polymers are prepared by polymerizing ethylene, optionally in the presence of an alpha-mono olefin comonomer containing 4 to 12 carbon atoms in the presence of certain metallic catalysts such as chromium catalysts, e. g. $CrO_3$ supported on silica-alumina supports, and the Ziegler-Natta catalysts, e.g. $TiCl_3$ employed in conjunction with certain aluminum alkyl cocatalysts. The requisite density and melt index desired in the polymer are obtained by proper control of polymerization conditions including temperature, pressure, comonomer concentration. The preferred linear high-density ethylene polymers will have a density of at least about 0.94 g/ml. The especially preferred polymers will have a density of at least about 0.95 g/ml. Stress crack resistance is conventionally conducted with test methods as established by Technical Bulletin PBI 11-1978 of the Plastic Bottle Institute, Rev. 1-1991 or ASTM D2561-70 (Reapproved 1989).

Antioxidant masterbatch is used for improving oxidation resistance during processing or recycled resin. Preferably, 1% w/w of antioxidant masterbatch is added into the resin formulation.

Suitable linear low-density polyethylene (LLDPE) includes copolymers of ethylene and α-olefins. Alpha-olefins include 1-butene, 1-hexene, and 1-octene, and mixtures thereof. LLDPE is commercially available.

Suitable high-density polyethylene (HDPE) includes ethylene homopolymer and copolymer of ethylene and α-olefins. Suitable alpha-olefins include 1-butene, 1-hexene, and 1-octene, and mixtures thereof. HDPE is commercially available.

Suitable recycled HDPE or post-consumer HDPE resins should have a melt flow rate less than 1 g/10 min for easy blending with virgin HDPE resins.

A process of orientation is employed to impart desirable properties to films, including making cast films tougher (higher tensile properties). Depending on whether the film is made by casting as a flat film or by blowing as a tubular film, the orientation process requires substantially different procedures.

Blown films of HDPE resins tend to have greater stiffness and toughness. In contrast, cast films usually have the advantages of greater film clarity and uniformity of thickness and flatness, generally permitting use of a wider range of polymers producing a higher quality film.

Polyethylene films preferably containing HDPE are oriented up to four times in the machine direction to give films having good dead-fold and water-vapor barrier characteristic making them suitable for packaging tubes, particularly when further laminated with other polyethylene layers by using adhesive or extrusion lamination.

When the film has been stretched in a single direction (monoaxial orientation), the resulting film exhibits better strength and stiffness along the direction of stretch, but it is weak in other directions, i.e., across the stretch, often splitting or tearing when pulled.

Metallization is the process of depositing aluminum vapor on a film substrate providing a shiny and metallic look like a mirror. To enhance process performance, high barrier metallization for foil replacement and increased shelf life, higher surface energy and better surface energy retention of the vacuum deposited layer as well as high metal adhesion/bond strength are critical requirements. There is a high demand for metal adhesion levels which are greater than 200 g/15 mm, or even up to 600 g/15 mm. Most adhesives typically fail around 200-300 g/15 mm in the laminate structure.

Single layer metal adhesion is frequently measured by seal/peel tests with ethylene acrylic acid (EAA) film, and delamination in the laminate structure can take place at the metal-polymer interface at a lower bond strength value than obtained in the EAA peel test. Therefore, the type of laminate structure (duplex/triplex), the adhesive, the sealant web type and thickness are important and will impact failure behavior. Conventional inline plasma pre-treatment can achieve outstanding metal adhesion beyond other levels. Moreover, selecting a technology that involves the deposition of a hybrid coating layer having a tailored coating stoichiometry and gradient can result in drastically enhanced anchoring properties to a base polymer substrate even at very high optical density (OD) levels, where it is typically more difficult to achieve good adhesion levels.

The film substrate for metallization can be polyester, polypropylene, or polyethylene, but in that case it should be polyolefin to enable further laminate with other layers and to make it fully recyclable.

A coextrusion blown film with an outer layer comprising at least three layers can be used for providing good tensile strength and puncture resistance. In the embodiments, the multilayered film comprises one or more polymeric materials such as low-density polyethylene, linear low-density polyethylene, high density polyethylene, copolymer of ethylene and propylene. Recycled HDPE resin and post-consumer HDPE resin should be added in a middle layer of an inner film layer. The recycled content should not be so high that it lowers the mechanical properties of the outer layer. One embodiment of the invention is a five-layer film: polyolefin/tie/EVOH/tie/polyolefin. Another embodiment of the invention is a seven-layer film: polyolefin/HDPE/tie/EVOH/tie/HDPE/polyolefin.

The substrate for aluminum metallization may comprise any one or more polyolefin materials suitable for use in a multilayer structure. Such materials include, for example, a multilayer blown or cast film with unoriented, monoaxial oriented, or biaxial oriented polyolefins, and any combination of two or more thereof. A five-layered blown film of PE/Adhesive/EVOH/Adhesive/PE can be used in filled products for enhancing the protection of a metallic layer from delamination by absorption of substances in the filled products.

The metallization on the top surface of a substrate (skin layer) may be accomplished using an appropriate technique. In one embodiment, the skin layer is pretreated, such as by corona treatment and plasma treatment, prior to metallization. Metallization may be done by a physical vapor deposition process. In such processes, the metal is heated and evaporated under vacuum. The metal then condenses on the skin layer.

The resulting metallized skin layer exhibits an optical density of at least 2.0. The optical density of the metallized skin layer may be from 2.0 to 2.8. Any appropriate metal can be used, depending on the final application used for the multilayer film/sheet. Commonly used metals include aluminum, nickel, and chromium.

Recycled HDPE resin and post-consumer HDPE resin should be added in the middle layer of the inner film layer which is not in direct contact with other layers.

Tie resins are selected based on the layers being bonded, the melt index, process conditions, secondary operations (e. g. orientation) and the cost. The melt index should be selected so that the layers in contact have similar viscosities; otherwise, the flow instabilities can lead to waviness or poor layer distribution. Generally, the interior layer should have the highest viscosity while the outer or skin layer should have the lowest viscosity. A suitable tie-layer adhesive is maleic-anhydride grafted polyolefins or derivatives thereof.

A barrier resin which is Ethylene-vinyl alcohol copolymer (EVOH) and its derivatives are employed as a barrier to oxygen. Ethylene content in the EVOH resin should be lower than 35 mol % to provide enough oxygen barrier to the laminate tube. However, EVOH with a minimum of 32 mol % ethylene can be compatible with a post-consumer HDPE recycling stream.

Coextrusion blown films with at least three layers are used for providing good tensile strength and puncture resistance.

9

Figure 2:
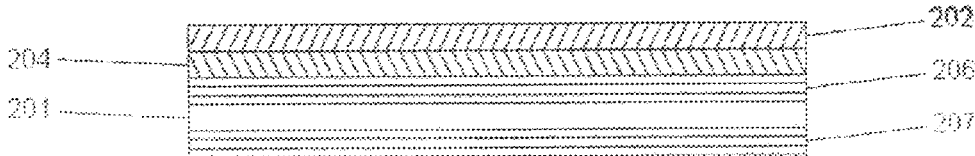
FIG. 2 is a five-layer for forming into the multi-layer packaging tube of the invention.

In the embodiments, the multilayered film comprises one or more polymeric materials such as low-density polyethylene, linear low-density polyethylene, high density polyethylene, or a copolymer of ethylene and propylene. Recycled HDPE resin and post-consumer HDPE resin should be added in the middle layer of the inner film layer. As shown in FIG. 2 of the drawings, in one embodiment of the invention a coextrusion blown film may be formed from a five-layer film 200 comprising: polyolefin/tie/EVOH/tie/polyolefin as denoted in FIG. 2 by reference numerals 202, 204, 206, 201 and 207 respectively. As shown in FIG. 1, in another embodiment of the invention a coextrusion blown film 100 may be formed from a seven-layer film comprising: polyolefin/HDPE/tie/ EVOH/tie/HDPE/polyolefin as denoted in FIG. 1 by reference numerals 102, 104, 106, 107, 108, 109 and 110 respectively.

By switching virgin resin to recycled resin, the present invention can be successfully used to produce recyclable and recycled tubes. Additives such as calcium carbonate filler should not be included in the laminate tubes to avoid a change in density property greater than 1. A tube flake with density greater than 1 will sink during a sink/float recycling process. The loss of plastic wastes would result in a lower recyclability percentage.

The following examples provide details that illustrate the invention but the invention is not to be considered limited to what is shown in these examples.

Figure 3:
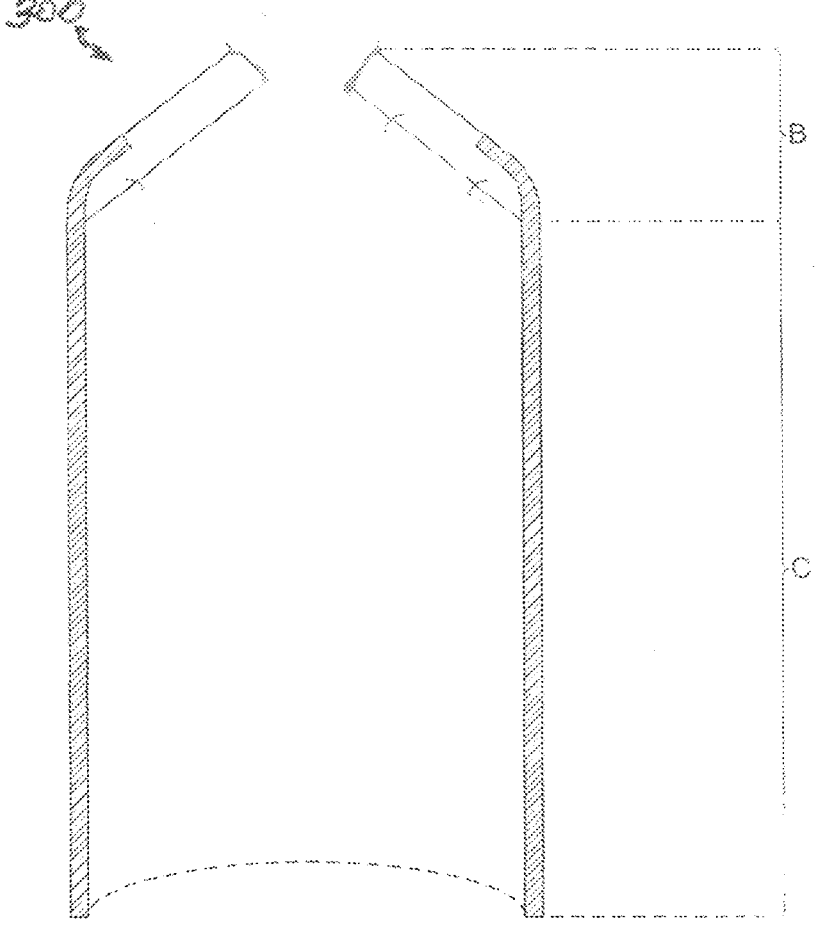
FIG. 3 is a cross section of a multi-layer packaging tube of the invention.

Example 1: KPL-01: Outer PCR Film/LL Extrusion/Tie/EVOH/Tie/LL Extrusion/Inner PCR Film, Total Thickness 350 Micron In this example, a five-layer tube 300 with a body portion C and a shoulder B is formed as shown diagrammatically in FIG. 3. A three-layered blown film is made for the outer film by incorporating 70% w/w of PCR-HDPE in the core layer of the film. A three-layered blown film is made for the inner film by incorporating 70% w/w of PCR-HDPE in the core layer of the film. Thereafter, the outer film is laminated with the inner film by using co-extrusion lamination of LLDPE/ Tie/EVOH/Tie/LLDPE. The virgin or recycled HDPE content to other PE-based resins in total tube structure should have higher than 50% w/w. HDPE resin should have melt index less than 1. EVOH resin should have ethylene content higher than 32 mol % and melt index should be less than 5 g/10 min. The EVOH content in total structure should be less than 5% w/w.

TABLE 4 shows film and shoulder according to Example 1.

| Laminate sheet/shoulder | Layer | % w/w of PCR_HDPE | Thickness (micron) |
|---|---|---|---|
| Outer film | Layer 1 | — | 40 |
| | Core layer 2 | 70% | 80 |
| | Layer 3 | — | 40 |
| Co-extrusion multilayers with barrier layer | — | — | 100 |
| Inner film | Layer 1 | — | 22.5 |
| | Core layer 2 | 70% | 45 |
| | Layer 3 | — | 22.5 |
| Tube shoulder | — | 60% | N/A |
| (Tube diameter 60 mm, tube length 210 mm) | | | 33% |
| Total % w/w of PCR in Tube | | | |

10

Example 2 KPL-02: Outer PCR Film/Dry/Metalized-PE Film/LL Extrusion/Tie/EVOH/Tie/LL Extrusion/Inner PCR Film, Total Thickness 350 Micron Three-layered blown film is made for middle film by incorporating 70% w/w of PCR-HDPE in the core layer of the film. Three-layered blown film is made for inner film by incorporating 70% w/w of PCR-HDPE in the core layer of the film. The middle film with the thickness of 90 micron evaporated on one side with metal is adhesive-laminated outer polyethylene film (40 micron) by using an adhesive agent. Next, this laminate film is further laminated with inner polyethylene film (120 micron) by using extrusion lamination with hot-melted resins of LLDPE, tie, and ethylene vinyl alcohol (EVOH). The virgin or recycled HDPE content to other PE-based resins in total tube structure should have higher than 50% w/w. EVOH resin should have ethylene content higher than 32 mol % and melt index should be less than 5 g/10 min. The EVOH content in total structure should be less than 5% w/w.

TABLE 5 shows film and shoulder according to Example 2

| Laminate sheet | Layer | % w/w of PCR_HDPE | Thickness (micron) |
|---|---|---|---|
| Outer film | — | — | 40 |
| Middle film with aluminum metalized layer on top | Layer 1 | — | 22.5 |
| | Core layer 2 | 70% | 45 |
| | Layer 3 | — | 22.5 |
| Co-extrusion multilayers with barrier layer | — | — | 100 |
| Inner film | Layer 1 | — | 30 |
| | Core layer 2 | 70% | 60 |
| | Layer 3 | — | 30 |
| Tube shoulder | — | 60% | N/A |
| (Tube diameter 60 mm, tube length 210 mm) | | | 30% |
| Total % w/w of PCR in Tube | | | |

Gel defects may occur from contamination, inadequate melting, inadequate mixing, or thermal degradation. All plastic resins degrade as a function of time, temperature, and shear conditions. In this case, recycled resin used in the present invention may play an important role for gel defect. Gel counts on laminate tube are done manually by the naked eye.

Gels/dots defects on a tube that might be caused by the use of recycled resin may be acceptable to a customer due to enable recycling. The purpose of recycling is to minimize or completely avoid sending waste to a landfill or incinerator.

Oxygen transmission rate is measured at 25 degrees Celsius and 0% relative humidity by using ASTM F1307-02, a machine from Illinois Model 8001L. Water vapor transmission rate is measured at 38 degrees Celsius and 90% relative humidity by using ASTM F1249-06. In a recycled plastic laminate tube with a 24% w/w of PCR-HDPE, it is found that contaminants/unmelts/thermal degradation of recycled resin slightly affects the oxygen barrier property.

TABLE 6

| | | | Dots at tube shoulder (%) | | | | | Gels/dots at tube body (%) | |
| | | | | | | | | Front panel | Back panel |
| Property | OTR (cc/pkg · day) | WVTR (g/m² · day) | <0.05 mm | 0.05-0.1 mm | 0.1-0.2 mm | 0.2-0.3 mm | 0.3-0.5 mm | 0.5-2.0 mm | 0.5-2.0 mm |
|---|---|---|---|---|---|---|---|---|---|
| Virgin-PBL380/EV15 Tube | 1.75 | 0.035 | <1% | <1% | <1% | <1% | <1% | <1% | <1% |
| 24% w/w of PCR-PBL380/EV15 Tube | 5.03 | 0.018 | 26.30% | 11.76% | 5.74% | 1.57% | 0.09% | 21.67% | 2.22% |

BEST MODE FOR CARRYING OUT THE INVENTION

As stated above in the detailed description of this application.

The invention claimed is:

1. A recycled and recyclable multi-layer packaging tube produced from a multilayer film comprising the following components disposed in the multilayer film in the following order:

a) an outer layer film comprising a first blend consisting of a virgin high-density polyethylene resin and a recycled resin, wherein the recycled resin is a post-industrial recycled resin (PIR) or a post-consumer recycled resin (PCR);

b) a polyolefin-based extrusion layer abutting the outer layer film;

c) a first extrusion tie layer;

d) a barrier layer comprising an ethylene-vinyl alcohol copolymer (EVOH);

e) a second extrusion tie layer;

f) a second polyolefin-based extrusion layer; and g) an inner layer film comprising a second blend consisting of the virgin high-density polyethylene resin and the recycled resin;

wherein the outer layer film comprises a printed image;

wherein an EVOH content in the multi-layer packaging tube is less than 5 wt %;

wherein each of the first and second blends comprises about 15-70 wt % of the recycled resin and about 30-85 wt % of the virgin high-density polyethylene resin; and wherein the virgin high-density polyethylene resin and the recycled resin in the multi-layer packaging tube together have a high-density polyethylene (HDPE) content that is higher than 50 wt %.

2. The recycled and recyclable multi-layer packaging tube of claim 1, comprising a body portion and a shoulder portion, wherein the body portion contains an HDPE content that is higher than 50 wt % and the shoulder portion contains an HDPE content that is between 75-85 wt %.

3. The recycled and recyclable multi-layer packaging tube of claim 1, wherein each of the first and second blends is formed by fusing pellets and flakes of the respective virgin high-density polyethylene resin and the recycled resin that are selected such that linear high-density ethylene copolymer included in the blends has a density of at least about 0.94 g/ml and a melt index of less than about 0.5 g/10 minutes.

4. A recycled and recyclable multi-layer packaging tube produced from a multilayer film comprising the following components disposed in the multilayer film in the following order:

a) an outer layer film comprising a first blend consisting of a virgin high-density polyethylene resin and a recycled resin, wherein the recycled resin is a post-industrial recycled resin (PIR) or a post-consumer recycled resin (PCR);

b) an adhesive abutting the outer layer film;

c) a metallized polyolefin layer having aluminum vapor on a top side thereof;

d) a first polyolefin-based extrusion layer abutting the metallized polyolefin layer;

e) an extrusion tie layer;

f) a first barrier layer comprising an ethylene-vinyl alcohol copolymer (EVOH);

g) a second extrusion tie layer;

h) a second polyolefin-based extrusion layer abutting the metallized polyolefin layer; and i) an inner layer film comprising a second blend consisting of the virgin high-density polyethylene resin and the recycled resin;

wherein the outer layer film comprises a printed image;

wherein an EVOH content in the multi-layer packaging tube is less than 5 wt %;

wherein each of the first and second blends comprises about 15-70 wt % of the recycled resin and about 30-85 wt % of the virgin high-density polyethylene resin; and wherein the virgin high-density polyethylene resin and the recycled resin in the multi-layer packaging tube together have a high-density polyethylene (HDPE) content that is higher than 50 wt %.

5. The recycled and recyclable multi-layer packaging tube of claim 2, comprising a body portion and a shoulder portion, wherein the body portion contains an HDPE content that is higher than 50 wt % and the shoulder portion contains an HDPE content that is between 75-85 wt %.

6. The recycled and recyclable multi-layer packaging tube of claim 4, wherein each of the first and second blends is formed by fusing pellets and flakes of the respective virgin high-density polyethylene resin and the recycled resin that are selected such that linear high-density ethylene copolymer included in the blends has a density of at least about 0.94 g/ml and a melt index of less than about 0.5 g/10 minutes.

* * * * *